Patented Nov. 9, 1937

2,098,812

UNITED STATES PATENT OFFICE 2,098,812

CERAMIC MATERIAL

Hans Pulfrich, Berlin-Wilmersdorf, Germany, assignor to General Electric Company, a corporation of New York No Drawing. Application December 31, 1936, Serial No. 118,677. In Great Britain July 31, 1934

6 Claims. (Cl. 106—9)

The present invention comprises a new refractory ceramic material. It is the object of my invention to provide refractory materials which are adapted to make a vacuum-tight or hermetical seal when welded or joined by fusion to glass or by means of glass to metal.

The new compositions embodying my invention have as main components an oxide of the group consisting of magnesium and beryllium and an oxide of the group consisting of titanium and zirconium. A preferred embodiment of my invention has as main components magnesium oxide and titanium oxide in equal parts by weight.

In the production of vacuum tubes and the like, it is frequently desired to join a refractory body directly to glass. Such a union involves great difficulty, especially when soft glass is employed. Upon cooling cracks occur which cause leaks.

In utilizing my invention there is joined to the glass component a ceramic material which has as main components an oxide of the group consisting of magnesium and beryllium and an oxide of the group consisting of titanium and zirconium. Although it is preferred to use substantially pure compositions the use of modifying agents, for example bonding agents, is not precluded. Such ceramic materials can be readily sintered at about 1400° to about 1500° C. The sintered bodies are gas-tight and are stable and resistant to temperature changes. They can be fusion-sealed to soft glass, such seals causing no difficulties due to the favorable expansion coefficient of the ceramic body. In making fusion seals with metals, such as copper-clad wire, chrome-iron, chrome-nickel, and iron-nickel alloys, platinum, etc., an intermediate layer composed, for example, of an enamel or soft glass, is employed as a sealing or bonding layer for firmly and permanently uniting the ceramic body with the metal.

Although magnesium oxide is employed in preferred embodiments of my invention, magnesium oxide may be replaced partly or wholly by beryllium oxide; also, titanium oxide may be replaced partly or wholly by zirconium oxide. I desire by the accompanying claims to cover all such variations and modifications of my invention.

The following materials in which the ingredients are indicated in molecular proportions are illustrative of my invention:

| | |
|---|---|
| 2 mols magnesium oxide | 1 mol. titanium oxide |
| 1 mol. magnesium oxide | 1 mol. titanium oxide |
| 2 mols beryllium oxide | 1 mol. titanium oxide |
| 1 mol. beryllium oxide | 1 mol. titanium oxide |
| 2 mols magnesium oxide | 1 mol. zirconium oxide |
| 1 mol. magnesium oxide | 1 mol. zirconium oxide |
| 2 mols beryllium oxide | 1 mol. zirconium oxide |
| 1 mol. beryllium oxide | 1 mol. zirconium oxide |

In preparing a ceramic body in accordance with this invention each of the components is used as a mixture of different grain sizes. For example, in preparing a ceramic body having as components magnesium oxide and titanium oxide, coarse-grained and fine-grained magnesium oxide is mixed with coarse-grained and fine-grained titanium oxide.

A more specific illustration of the preparation of a vacuum-tight ceramic body in accordance with this invention is as follows:

| | Parts by weight |
|---|---|
| Titanium oxide, fired at about 1200° C | 10 |
| Titanium oxide, fired at about 1400° C | 40 |
| Magnesium oxide, fired at about 1550° C | 50 |
| Siliceous ceramic bonding agent | 12 |

The 12 parts by weight of siliceous ceramic bonding agent mentioned in the foregoing formula advantageously may be about 10 parts by weight of a substance which is essentially magnesium silicate, for example talc, and about 2 parts by weight of a substance which is essentially aluminum silicate, for example kaolin. Other siliceous bonding agents may be employed, for example, substances consisting mainly of, or containing, silicates of metals such as calcium, strontium, barium, beryllium, and the like.

The above-described component materials are wet milled for a suitable length of time, for instance for about 15 hours, then dry milled, screened, pressed into the desired shape, and subjected to a temperature sufficiently high and for a period of time sufficiently long to form a shaped, vacuum-tight ceramic mass or body. A temperature of about 1400° to 1500° C. advantageously may be used in this operation. By the process, and using the component materials described, a ceramic body having a coefficient of linear thermal expansion of about $90.10^{-7}$ per degree centigrade may be produced.

Ceramic bodies can be manufactured in accordance with this invention varying over a substantial range in coefficient of linear thermal expansion, for example, between $80.10^{-7}$ per degree centigrade and $130.10^{-7}$ per degree centigrade. The particular coefficient of linear thermal expansion of products of this invention is dependent upon the selected components and relative proportions thereof, as well as upon the selected grain sizes of such components and the temperature at which they are fired.

The readiness with which the ceramic bodies embodying my invention can be fusion-sealed to glass renders them particularly suitable for the fabrication of vacuum tubes. For example, in the manufacture of incandescent lamps and electrical discharge tubes, it is possible to employ plates consisting of such materials, which plates replace the heretofore customary stem and base construction. Besides effecting a simplification and reduction in size of the construction the use of such materials effects a saving of metal.

In addition to the seals to glass, the ceramic bodies of this invention also may be used as electric insulators, as dielectrics for condensers and as fireproofing materials.

The present invention provides ceramic bodies which not only are adapted to make a vacuum-tight or hermetical seal when welded or joined by fusion to glass or by means of glass to metal, but also provides ceramic bodies which themselves are vacuum- or gas-tight. It is possible to make an entire electric vacuum tube container from material embodying my invention and to make electrode supports from such material.

This application is a continuation-in-part of my application Serial No. 31,719, filed July 16, 1935, and assigned to the same assignee as the present application. In that earlier filed application I have made claims to a composite body consisting in part of a glass member and in part of a ceramic body such as described and claimed in the present application.

What I claim as new and desire to secure by Letters Patent of the United States is:

1. A sintered ceramic material which is substantially impenetrable by gases and is adapted to be fusion-welded to glass and to form a vacuum-tight seal therewith, said material having a coefficient of linear thermal expansion not substantially exceeding $130.10^{-7}$ and including as one component an oxide of the group consisting of magnesium and beryllium, having as another component an oxide of the group consisting of titanium and zirconium, the mol. ratio of said first-named component to said last-named component being at least about 1 to 1, and having as a third component a siliceous ceramic bonding agent.

2. A sintered ceramic material having a coefficient of linear thermal expansion not substantially in excess of $130.10^{-7}$, said material consisting essentially of the product of sintering together an oxide of the group consisting of magnesium and beryllium, an oxide of the group consisting of titanium and zirconium, and a siliceous ceramic bonding agent, said oxide components being so proportioned that the mol. weight of oxide of the first-named group is approximately equal to the mol. weight of oxide of the last-named group.

3. A ceramic material consisting essentially of the product of sintering together about 50 parts by weight of magnesium oxide, about 50 parts by weight of titanium oxide and about 12 parts by weight of a bonding agent comprising mainly alkaline earth metal silicate, said material having a coefficient of linear thermal expansion between about $80.10^{-7}$ per degree centigrade and about $130.10^{-7}$ per degree centigrade.

4. A ceramic material consisting essentially of the product of sintering together, at a temperature of about 1400° to 1500° C., about 50 parts by weight of magnesium oxide, about 50 parts by weight of titanium oxide, about 10 parts by weight of a substance which is mainly magnesium silicate and about 2 parts by weight of a substance which is mainly aluminum silicate, said material having a coefficient of linear thermal expansion between about $80.10^{-7}$ per degree centigrade and about $130.10^{-7}$ per degree centigrade.

5. The method of making a sintered ceramic material which is capable of being fusion-welded to glass and forming a vacuum-tight seal therewith, said method comprising sintering together a mixture consisting essentially of an oxide of the group consisting of magnesium and beryllium, an oxide of the group consisting of titanium and zirconium, and a siliceous ceramic bonding agent, said oxide components being so proportioned that the mol. weight of oxide of the first-named group is at least equal to the mol. weight of oxide of the last-named group and all of said components being so proportioned that the sintered mass has a coefficient of linear thermal expansion not substantially exceeding $130.10^{-7}$.

6. The method of making a shaped ceramic material adapted to be fusion-welded to glass which comprises shaping a mass consisting essentially of about 50 parts by weight of magnesium oxide, about 50 parts by weight of titanium oxide and about 12 parts by weight of a bonding agent comprising mainly alkaline earth metal silicate, and subjecting said mass to a temperature sufficiently high and for a period of time sufficiently long to transform said mass into a sintered ceramic material capable of being fusion-welded to glass and forming a vacuum-tight seal therewith.

HANS PULFRICH.